(12) United States Patent
Feng et al.

(10) Patent No.: US 12,366,544 B2
(45) Date of Patent: Jul. 22, 2025

(54) CARBON FIBER COMPOSITE PANEL WITH INTEGRATED FAULT DETECTION AND HEALTH MONITORING

(71) Applicants: GM GLOBAL TECHNOLOGY OPERATIONS LLC, Detroit, MI (US); COLUMBIA UNIVERSITY, New York, NY (US)

(72) Inventors: Maria Q. Feng, New York, NY (US); Venkateshwar R. Aitharaju, Troy, MI (US); Luke Demo, New York, NY (US); Eleonora Maria Tronci, New York, NY (US)

(73) Assignees: GM GLOBAL TECHNOLOGY OPERATIONS LLC, Detroit, MI (US); COLUMBIA UNIVERSITY, New York, NY (US)

( * ) Notice: Subject to any disclaimer, the term of this patent is extended or adjusted under 35 U.S.C. 154(b) by 434 days.

(21) Appl. No.: 17/740,543

(22) Filed: May 10, 2022

(65) Prior Publication Data
US 2023/0366846 A1 Nov. 16, 2023

(51) Int. Cl.
| | | |
|---|---|---|
| *G01N 27/20* | (2006.01) | |
| *B32B 3/08* | (2006.01) | |
| *B32B 5/26* | (2006.01) | |

(52) U.S. Cl.
CPC .............. *G01N 27/20* (2013.01); *B32B 3/08* (2013.01); *B32B 5/26* (2013.01); *B32B 2250/05* (2013.01); *B32B 2250/20* (2013.01); *B32B 2250/40* (2013.01); *B32B 2262/101* (2013.01); *B32B 2262/106* (2013.01); *B32B 2305/34* (2013.01); *B32B 2605/00* (2013.01); *B32B 2607/00* (2013.01)

(58) Field of Classification Search
CPC .... B32B 5/02; B32B 5/12; B32B 5/26; B32B 3/08; B32B 2250/50; B32B 2607/00; B32B 2307/206; B32B 2605/00; B32B 2262/101; B32B 2262/106; B32B 2305/34; G01N 27/00
USPC ....................................................... 428/367
See application file for complete search history.

(56) References Cited

U.S. PATENT DOCUMENTS

| | | |
|---|---|---|
| 7,819,462 B1 | 10/2010 | Owens |
| 8,033,592 B2 | 10/2011 | Hsu et al. |
| 2006/0106147 A1 | 5/2006 | Fasulo et al. |
| 2006/0199890 A1 | 9/2006 | Fasulo et al. |
| 2007/0299185 A1 | 12/2007 | Ottaviani et al. |
| 2010/0098925 A1 | 4/2010 | Fasulo et al. |

(Continued)

FOREIGN PATENT DOCUMENTS

| | | |
|---|---|---|
| CN | 206638267 U | 11/2017 |

OTHER PUBLICATIONS

U.S. Appl. No. 17/592,901, filed Feb. 4, 2022, Aitharaju et al.
Chinese Office Action from counterpart CN2022113355196, dated May 1, 2025.

*Primary Examiner* — Camie S Thompson

(57) ABSTRACT

A composite panel includes a first carbon fiber layer and a first glass fiber layer. A first carbon fiber sensor includes a first plurality of carbon fiber tows. The composite panel includes a second glass fiber layer and a second carbon fiber layer. The first carbon fiber sensor is arranged between the first glass fiber layer and the second glass fiber layer. The first carbon fiber layer and the second carbon fiber layer are arranged adjacent to the first glass fiber layer and the second glass fiber layer, respectively.

20 Claims, 7 Drawing Sheets

(56) References Cited

U.S. PATENT DOCUMENTS

2011/0121225 A1    5/2011   Posudievsky et al.
2020/0200696 A1    6/2020   Linde et al.

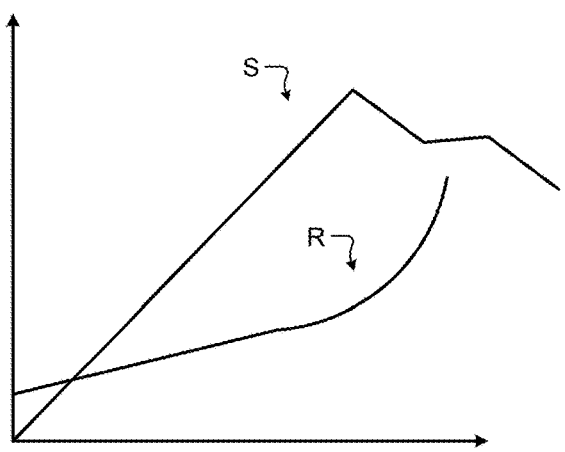
FIG. 8
FIG. 9A  FIG. 9B  FIG. 9C  FIG. 9D
 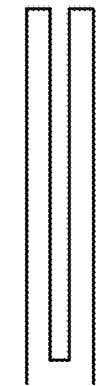 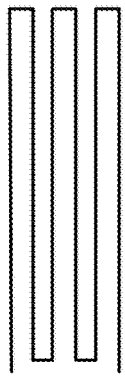 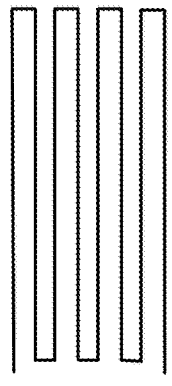
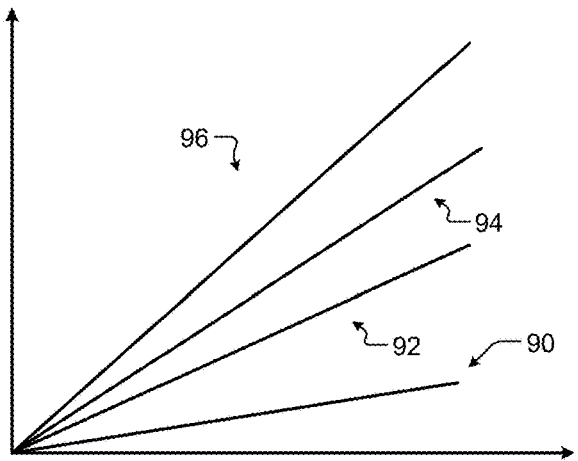
FIG. 10

CARBON FIBER COMPOSITE PANEL WITH INTEGRATED FAULT DETECTION AND HEALTH MONITORING

GOVERNMENT LICENSE RIGHTS

This invention was made with government support under DE-EE0009204 awarded by the US Department of Energy. The government has certain rights in the invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to carbon fiber composites and more particularly to systems and methods for monitoring faults and health of carbon fiber composite structures. Carbon fiber composites refer to any fiber reinforced polymer composites that contain carbon fibers.

Carbon fiber composites are increasingly being used as structural components in vehicles, aircraft, and other applications. Some of the composite panels are arranged in locations that are subjected to damage during operation. For example, a battery housing that encloses batteries of an electric vehicle may be made using a carbon fiber composite panel. In some applications, a bottom surface of the battery housing may be exposed below the electric vehicle and may be damaged by road debris. In some situations, significant structural damage may occur without significant visible damage and/or visible damage may occur without significant structural damage. It is difficult, time consuming and costly to evaluate damage to carbon fiber composite panels to diagnose whether repair or replacement needs to be made.

SUMMARY

A composite panel includes a first carbon fiber layer and a first glass fiber layer. A first carbon fiber sensor includes a first plurality of carbon fiber tows. The composite panel includes a second glass fiber layer and a second carbon fiber layer. The first carbon fiber sensor is arranged between the first glass fiber layer and the second glass fiber layer. The first carbon fiber layer and the second carbon fiber layer are arranged adjacent to the first glass fiber layer and the second glass fiber layer, respectively.

In other features, the first plurality of carbon fiber tows is connected in parallel to first and second nodes that extend from the composite panel. Each of the first plurality of carbon fiber tows of the first carbon fiber sensor has a unique resistance.

In other features, a second carbon fiber sensor includes a second plurality of carbon fiber tows connected in parallel to third and fourth nodes that extend from the composite panel. The composite panel includes a third glass fiber layer. The second carbon fiber layer is arranged between the second glass fiber layer and the third glass fiber layer. Each of the second plurality of carbon fiber tows of the second carbon fiber sensor has a unique resistance.

In other features, the first carbon fiber sensor is arranged rotated relative to the second carbon fiber sensor. One or more discrete resistors are connected to one or more of the first plurality of carbon fiber tows to change a resistance of the one or more of the first plurality of carbon fiber tows.

A damage monitoring system includes the composite panel. A controller is configured to measure an equivalent resistance of the first carbon fiber sensor and identify one or more of the first plurality of carbon fiber tows that are broken based on the equivalent resistance.

In other features, the controller is configured to identify a location of a broken one of the carbon fiber tows in the composite panel. The controller determines a change in the equivalent resistance of the first carbon fiber sensor relative to a predetermined resistance and selectively identifies one or more of the first plurality of carbon fiber tows that have been broken in response to the change in the equivalent resistance.

A composite panel includes a first carbon fiber layer, a first carbon fiber sensor comprising N hybrid tows including a plurality of carbon fiber filaments surrounded by a plurality of glass fiber filaments, where N is an integer greater than or equal to one, and a second carbon fiber layer. The first carbon fiber sensor is arranged between the first carbon fiber layer and the second carbon fiber layer.

In other features, N is greater than one and the N hybrid tows are connected in parallel to first and second node. Each of the N hybrid tows of the first carbon fiber sensor has a unique resistance.

In other features, a second carbon fiber sensor includes M hybrid tows connected in parallel to third and fourth nodes, where M is an integer greater than one. The second carbon fiber sensor is arranged between the first carbon fiber layer and the second carbon fiber layer. The first carbon fiber sensor is rotated relative to the second carbon fiber sensor.

A damage monitoring system includes the composite panel. A controller is configured to measure an equivalent resistance of the first carbon fiber sensor and identify one or more of the N hybrid tows that are broken based on the equivalent resistance. The controller is configured to identify a location of broken ones of the N hybrid tows in the composite panel. The controller is configured to determine a change in the equivalent resistance of the first carbon fiber sensor relative to a predetermined resistance and selectively identifies one or more the N hybrid tows that are broken in response to the change in the equivalent resistance.

A health monitoring system includes the composite panel and a controller configured to measure an equivalent resistance of the N hybrid tows, where N is equal to one; determine change in the equivalent resistance of the at least one of the N hybrid tows relative to a predetermined resistance; and calculate a health of the composite panel in response to the change in the equivalent resistance.

A health monitoring system includes a hybrid composite panel comprising a plurality of carbon fiber tows, and a plurality of glass fiber tows. A controller is configured to measure an equivalent resistance of at least one of the carbon fiber tows; determine change in the equivalent resistance of the at least one of the carbon fiber tows relative to a predetermined resistance; and calculate a health of the hybrid composite panel in response to the change in the equivalent resistance.

In other features the at least one of the carbon fiber tows is insulated the plurality of glass fiber tows. The controller is further configured to identify when the at least one of the carbon fiber tows is broken based on the equivalent resistance.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 8 is a graph illustrating resistance of carbon fiber tow as a function of stress/strain according to the present disclosure;

FIGS. 9A to 9D illustrates carbon fiber tows arranged in variable numbers of loops according to the present disclosure;

FIG. 10 is a graph illustrating a change in resistance of the carbon fiber tow as a function of stress/strain for different numbers of loops according to the present disclosure;

In the drawings, reference numbers may be reused to identify similar and/or identical elements.

DETAILED DESCRIPTION

The present disclosure relates to systems and methods for monitoring the health of a composite panel. In some examples, the carbon fiber composite panel includes carbon fiber outer layers, glass fiber layers acting as insulating layers, and one or more carbon fiber sensors each including one carbon fiber sensor or multiple carbon fiber tows connected in parallel. In other examples, the composite panel includes carbon fiber outer layers and a carbon fiber sensor one or more hybrid tows including carbon fiber filaments that are insulated by glass fiber filaments.

The carbon fiber sensors act as structural elements and sense stress/strain and/or damage to the composite panel. An equivalent resistance of the carbon fiber sensor is measured periodically or on an event basis. In some examples, the resistances of the carbon fiber tows of the carbon fiber sensors are varied and unique. A controller detects changes in the equivalent resistance and the changes are used to identify stress/strain, damage, and/or a location of the damage as will be described further below. The controller identifies faults and a location of the faults based on the equivalent resistance of the carbon fiber sensor.

In other examples, a hybrid composite panel includes carbon fiber tows and glass fiber tows. A controller estimates health of the composite panel by comparing the measured equivalent resistance to a predetermined resistance corresponding to an undamaged carbon fiber tow. The strain of the composite structure is monitored by measuring the electrical resistance of the carbon fiber tow. The equivalent resistance increases with the strain experienced by the carbon fiber tow. The increases in resistance due to stress/strain may be momentary or permanent. When one of the carbon sensor tows is completely broken, the carbon sensor tow becomes an open circuit and the resistance becomes infinite.

Load cycles and micro damage experienced by the composite panel during the service life cause a gradual permanent increase in the resistance. Therefore, the residual strength (or life) of the component can be predicted by measuring changes related to the current measured equivalent resistance and the undamaged equivalent resistance of the carbon fiber tow.

Figure 1:
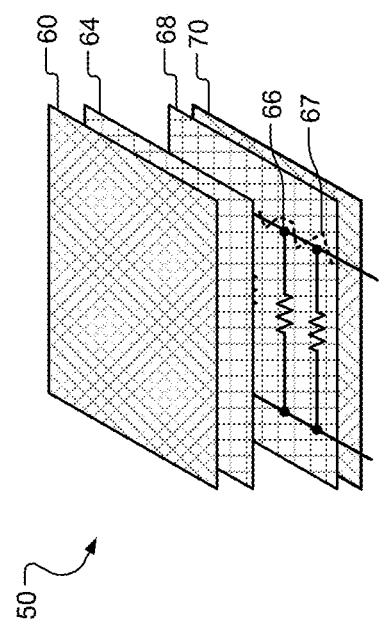
FIGS. 1 and 2 are perspective views showing examples of carbon fiber composite panels according to the present disclosure.
Figure 2:
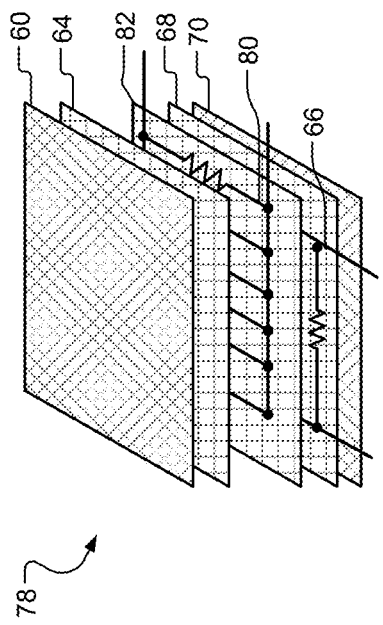

Referring now to FIGS. 1 and 2, examples of composite panels 50 and 78 are shown respectively. In FIG. 1, a composite panel 50 includes a stack of layers and resin bonding the stack of layers together. The stack of layers includes a carbon fiber layer 60. A glass fiber layer 64 is arranged next to the carbon fiber layer 60. A carbon fiber sensor 66 including a plurality of tows made of carbon fiber tow is located between the glass fiber layer 64 and a glass fiber layer 68.

Stitches 67 may be used to connect the carbon fiber sensor 66 in the composite panel (e.g., connecting to a glass fiber layer, another portion of the carbon fiber sensor and/or to a carbon fiber layer). In some examples, the stitches 67 are made of an insulating material such as nylon. A carbon fiber layer 70 is arranged adjacent to the glass fiber layer 68.

The carbon fiber sensor 66 includes a plurality of tows that are made using carbon fiber tow and connected in parallel to first and second nodes. Carbon fiber tows may extend from the first and second nodes to an edge of the composite panel for connection to a controller. The glass fiber layers 64 and 68 provide insulation between the carbon fiber sensor 66 and the carbon fiber layers 60 and 70. The controller (described further below) measures the equivalent resistance of the carbon fiber sensor 66 and identifies a location of damage based on the change in the equivalent resistance.

In FIG. 2, a composite panel 78 includes a carbon fiber layer 60, a glass fiber layer 64, a carbon fiber sensor 80 including a plurality of carbon fiber tows connected in parallel, a glass fiber layer 82, a carbon fiber sensor 66, a glass fiber layer 68 and a carbon fiber layer 70. In other words, an additional carbon fiber sensor and an insulation layer (glass fiber layer 86) is added. In some examples, the carbon fiber sensor 66 is arranged in a rotated position relative to the carbon fiber sensor 80 to allow more precise damage location at one or more junctions between two or more damaged legs (carbon fiber tow). In some examples, the carbon fiber sensor 66 is arranged transverse relative to the carbon fiber sensor 80.

In the examples described above, the carbon fiber tow in the carbon fiber sensors 66 and 80 is exposed. The glass fiber layers 64, 68, and 82 provide insulation between the carbon fiber sensor 66 and 80 and the carbon fiber layers 60 and 70. In some examples, the carbon fiber sensors 66 and 80 are arranged transverse to one another to allow a grid to be defined to provide location information in two orthogonal directions.

When the tows of the carbon fiber sensor are connected in parallel, an inverse of the equivalent resistance ($R_{eq}$) of the circuit is equal to a sum of inverses of the resistances in each leg or $1/R_{eq}=1/R_1+1/R_2+\ldots+1/R_N$. If the resistances $R_1$, $R_2$, ... and $R_N$ are sufficiently unique and are associated with different locations in the composite panel, then breakage of one of the tows (effectively increasing from a predetermined resistance value to an infinite resistance) will cause unique changes in the measured equivalent resistance relative to the equivalent resistance of an undamaged carbon fiber sensor. The unique changes in resistance can be used to identify the damaged tow. Since the position of the damaged tow is known, the location of damage is also determined. If two carbon fiber sensors are used with their sensor tows oriented orthogonal to one another, the stress/strain may damage two of the carbon fiber tows that are oriented orthogonal to one another. The junction between the two damaged carbon fiber tows is a likely location of the damage.

Figure 3A:
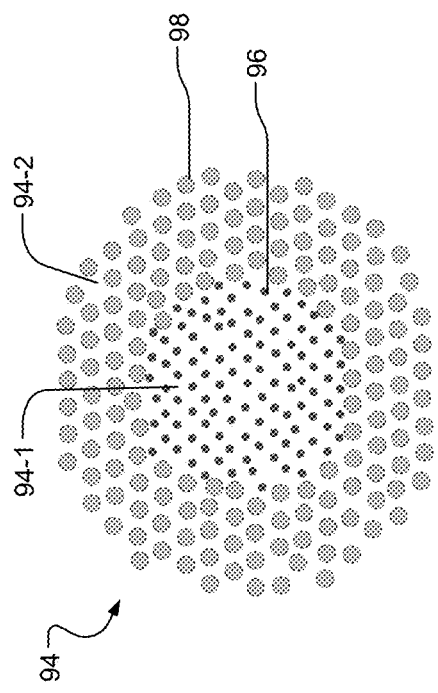
FIG. 3A is a cross-sectional view of an electrically insulated carbon fiber tow including a radially inner zone and a radially outer zone according to the present disclosure.

Referring now to FIG. 3A, an insulated carbon fiber tow 94 can be used instead of exposed carbon fiber as described above. The glass fiber layers can be omitted since the carbon fiber tow is insulated. The insulated carbon fiber tow 94 includes a radially inner zone 94-1 and a radially outer zone 94-2. A plurality of carbon fibers 96 are located in the radially inner zone 94-1 and a plurality of glass fibers 98 are located in the radially outer zone 94-2 to insulate the carbon fibers 96 located in the radially inner zone 94-1. In some examples, a carbon fiber to glass fiber ratio is in a range from 10:90 to 50:50.

Figure 4:
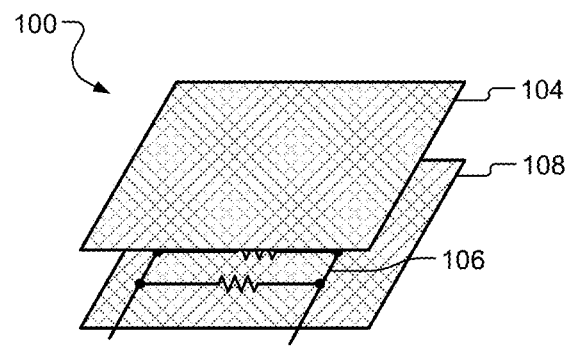
FIGS. 4 and 5 are perspective views showing examples of carbon fiber composite panels according to the present disclosure.
Figure 5:
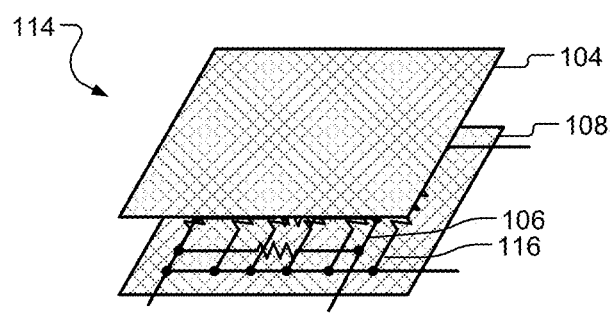

Referring now to FIGS. 4 and 5, examples of composite panels using the insulated carbon fiber tow of FIG. 3A are shown. In FIG. 4, a composite panel 100 includes a carbon fiber layer 104, a carbon fiber sensor 106 including a plurality of carbon fiber tows connected in parallel, and a carbon fiber layer 108. The carbon fiber sensor 106 is sandwiched between the carbon fiber layers 104 and 108. In FIG. 5, a composite panel 114 includes a second carbon fiber sensor 116 arranged between the carbon fiber layers 104 and 108 to allow additional sensing to be performed as will be described further below. Because the carbon fiber tow is insulated, the glass fiber layers can be omitted without causing short circuits.

Figure 3B:
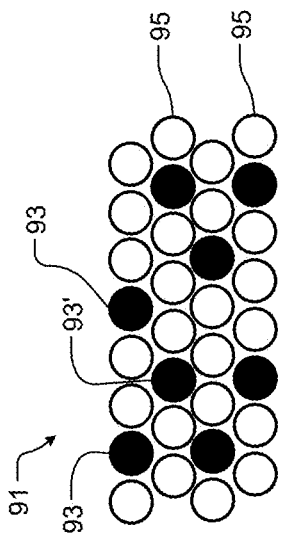
FIG. 3B is a cross-sectional view of a hybrid composite panel including carbon fiber tows and glass fiber tows where one or more of the carbon fiber tows act as a carbon fiber sensor according to the present disclosure.

In FIG. 3B, a cross sectional view of a hybrid composite panel 91 is shown. In some examples where the health of the composite panel is monitored, the equivalent resistance is measured periodically at predetermined intervals during operation to detect momentary stress/strain experienced by the composite panel. In some situations, the composite panel may return to a less stressed/strained state. In other examples, the stress/strain may be permanent. In some examples, the carbon fiber tow includes 1k to 50k carbon fiber filaments.

The hybrid composite panel 91 includes comingled carbon fiber tows 93 and glass fiber tows 95. One or more of the carbon fiber tows 93 (e.g. carbon fiber tow 93') can be used as a sensor tow. The glass fiber tows 95 surrounding the carbon fiber tow 93' (acting as the sensor tow) serve as electrical insulation. In FIG. 3B, the carbon fiber tows 93 and 93' and the glass fiber tows 95 act as load-bearing structural materials and as a sensor system, which saves manufacturing cost.

When the carbon fiber tow 93' of the hybrid composite panel 91 experiences stress/strain, the resistance of the carbon fiber tow 93' increases (but does not increase to infinity). As the hybrid composite panel 91 experiences stress/strain, the useful life of the hybrid composite panel 91 decreases. The measured changes in the equivalent resistance due to stress/strain can also be used to estimate the useful life of the hybrid composite panel 91 based on the increase in resistance (typically less than a broken tow).

Figure 6A:
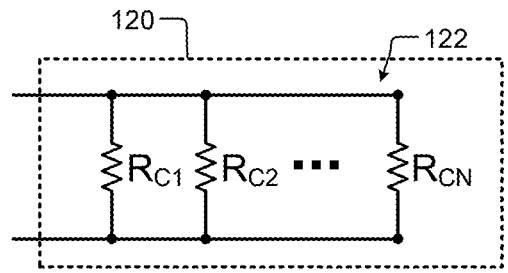
FIGS. 6A and 6B are electrical schematics showing examples of carbon fiber tows connected in parallel according to the present disclosure.
Figure 6B:
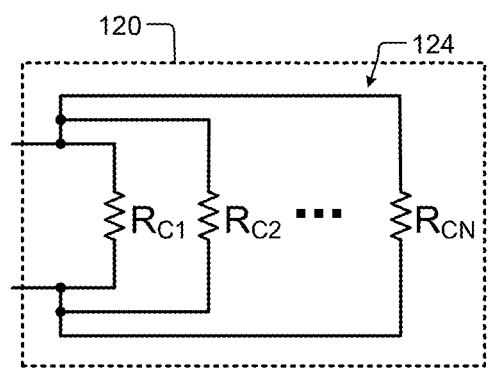

Referring now to FIGS. 6A and 6B, examples of carbon fiber sensors including carbon fiber tows connected in parallel are shown. Only one circuit is needed to measure the equivalent resistance of this multi-tow sensor. In FIG. 6A, a composite panel 120 includes a carbon fiber sensor 122 including carbon fiber tows that are connected in parallel and have different resistances $R_{C1}$, $R_{C2}$, ..., and $R_{CN}$. The carbon fibers in the carbon fiber tow typically have a predetermined resistance per unit of length. Therefore, longer lengths of the carbon fiber tow have higher resistance as compared to shorter lengths of the carbon fiber tow. In FIG. 6B, the parallel tows of a carbon fiber sensor 124 are shown to have varying lengths and are connected at first and second nodes located within the composite panel. The nodes are connected by carbon fiber tow to the controller located externally from the composite panel.

Figure 7A:
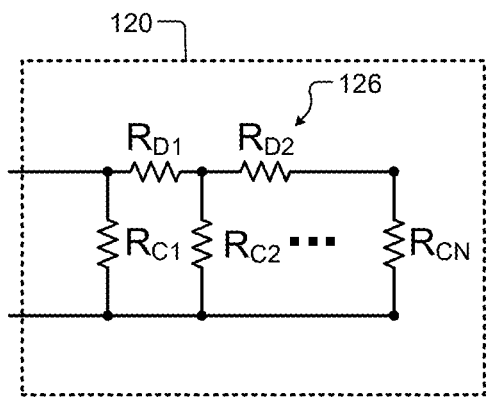
FIGS. 7A and 7B are electrical schematics showing examples of carbon fiber sensors including carbon fiber tows connected in parallel and including discrete resistors according to the present disclosure.

In FIG. 7A, the composite panel 120 includes a carbon fiber sensor 126 including carbon fiber tows that are connected in parallel and have different resistances $R_{C1}$, $R_{C2}$, ..., and $R_{CN}$. One or more discrete resistors $R_{D1}$, $R_{D2}$, ... may be connected in series and/or parallel to one or more of the carbon fiber tows to alter the resistance of the tow/leg. The discrete resistors may be used to increase separation between the unique equivalent resistances that occur due to damage and to increase the likelihood of detection.

Figure 7B:
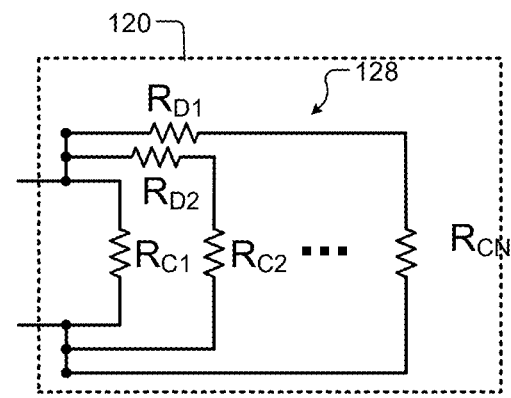

In some examples, the discrete resistors are embedded in the composite panel 120. In FIG. 7B, the composite panel 120 includes a carbon fiber sensor 128 including carbon fiber tows that are connected in parallel and have different resistances $R_{C1}$, $R_{C2}$, ..., and $R_{CN}$. One or more discrete resistors $R_{D1}$, $R_{D2}$, ... may be connected to one or more of the carbon fiber tows as described above.

Referring now to FIG. 8, a graph conceptually illustrates change in resistance R of carbon fiber tow as a function of stress/strain S of the composite panel. When the carbon fiber tow is placed under stress/strain S, the resistance R of the carbon fiber tow increases in a predictable manner prior to breakage. As the strain S increases to the extent that the carbon fiber filaments in the tow start to break, the resistance R of the tow drastically increases. Once the carbon fiber tow completely breaks, the resistance R increases to infinity. As will be described further below, the increase in resistance R (prior to breakage) caused by stress/strain S can be measured and used to predict health or a remaining operational life of the carbon fiber sensor.

Referring now to FIGS. 9A to 9D, carbon fiber tows are shown to include variable numbers of loops. The carbon fiber tow can be arranged in one or more loops in the composite panel. More loops will provide additional resistance values corresponding to the same amount of strain and, as a result, the sensitivity of the carbon fiber sensor is increased as will be described below.

Referring now to FIG. 10, a graph conceptually illustrates change in resistance of a carbon fiber tow as a function of strain for different numbers of loops. A single straight carbon fiber tow is shown at 90. At 92, a carbon fiber tow with two loops is shown. At 94 and 96, a carbon fiber tow including three and four loops is shown. As can be seen, the change in the resistance of carbon fiber tow due to strain increases with the number of loops. In other words, a carbon fiber tow with a higher number of loops provides higher sensitivity and allows more accurate measurement of stress/strain which allows the health estimate to be more accurate.

In some examples, the equivalent resistance of the carbon fiber tow is measured at predetermined intervals during a drive cycle (such as at less than or equal to 1 s, 5 s, 10 s, 60 s, etc.), the stress/strain for the carbon fiber sensors is calculated and stress/strain events at various levels are counted and stored. The controller evaluates the health of at least a corresponding portion of the composite panel based on the number of events at the various stress/strain levels. In some examples, the stress/strain levels are weighted and the health is determined based on a score determined based on the weights and the counts at the stress/strain levels.

Figure 11:
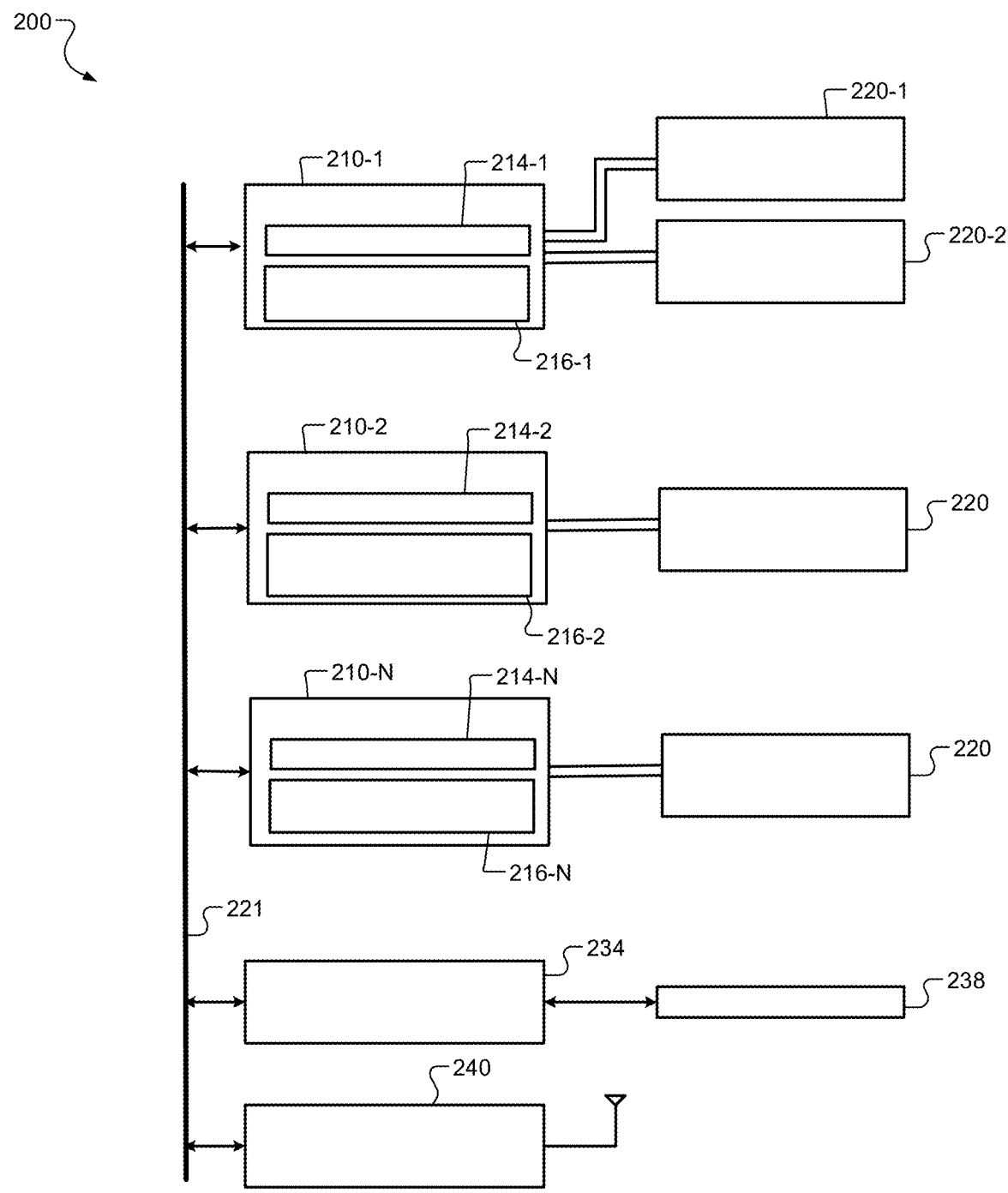
FIG. 11 is a functional block diagram of an example of a vehicle control system including a fault location module and/or a health estimating module according to the present disclosure.

Referring now to FIG. 11, a vehicle control system 200 includes a plurality of controllers 210-1, 210-2, . . . , and 210-N (collectively controllers 210). Each of the controllers 210-1, 210-2, . . . , and 210-N includes a fault location module 214-1, 214-2, . . . , and 214-C (collectively fault locations module 214) and/or a health estimating module 216-1, 216-2, . . . , and 216-N (collectively health estimating modules 216). Each of the controllers 210 is connected to one or more carbon fiber sensors 220. Some of the controllers 210 may be connected to more than one carbon fiber sensor 220 as shown in FIGS. 2 and 4 when a given region of a composite panel is monitored by two or more carbon fiber sensors.

The vehicle control system further includes a vehicle controller 234 and a telematics system 240. The vehicle controller 234 may be connected to a display 238 to notify a user of the fault. The controllers 210 are connected to the vehicle controller 234 via a bus 221 such as a controller area network (CAN) bus. In some examples, when a fault is detected or health is estimated, the vehicle controller 234 optionally sends a message (including a fault or health estimate) via the telematics system 240 to a remote server operated by a vehicle manufacturer or other party so that service can be scheduled and/or customer contact can be initiated. In some examples, the health estimate also includes an estimate of remaining life.

The fault location modules 214 periodically measure the resistance of the carbon fiber sensors. Each of the tows of the carbon fiber sensor have a unique resistance value. As a result of the unique resistance values, when one or more of the carbon fiber tows of the carbon fiber sensor fail, a location of a fault within the composite panel can be determined.

Figure 12:
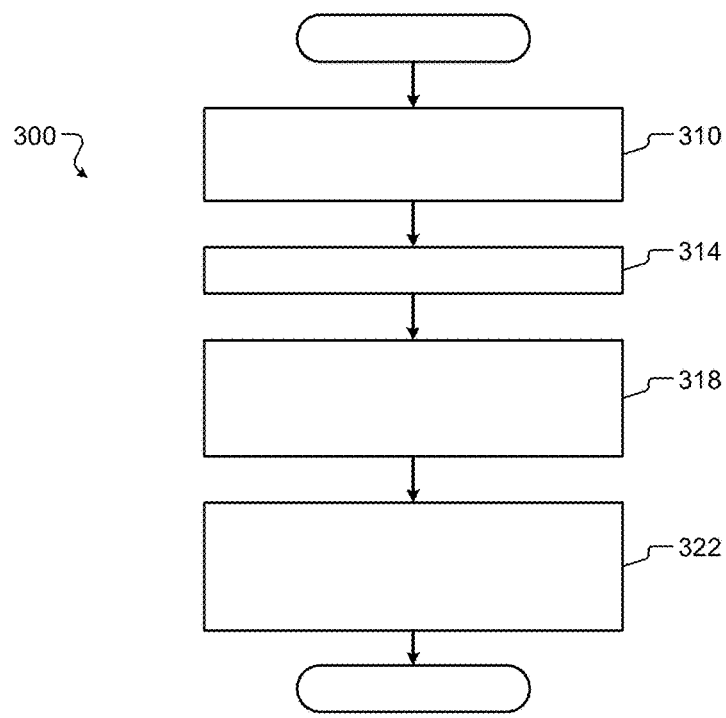
FIGS. 12 and 13 are flowcharts for examples of methods for identifying a location of damage in a composite panel according to the present disclosure.
Figure 13:
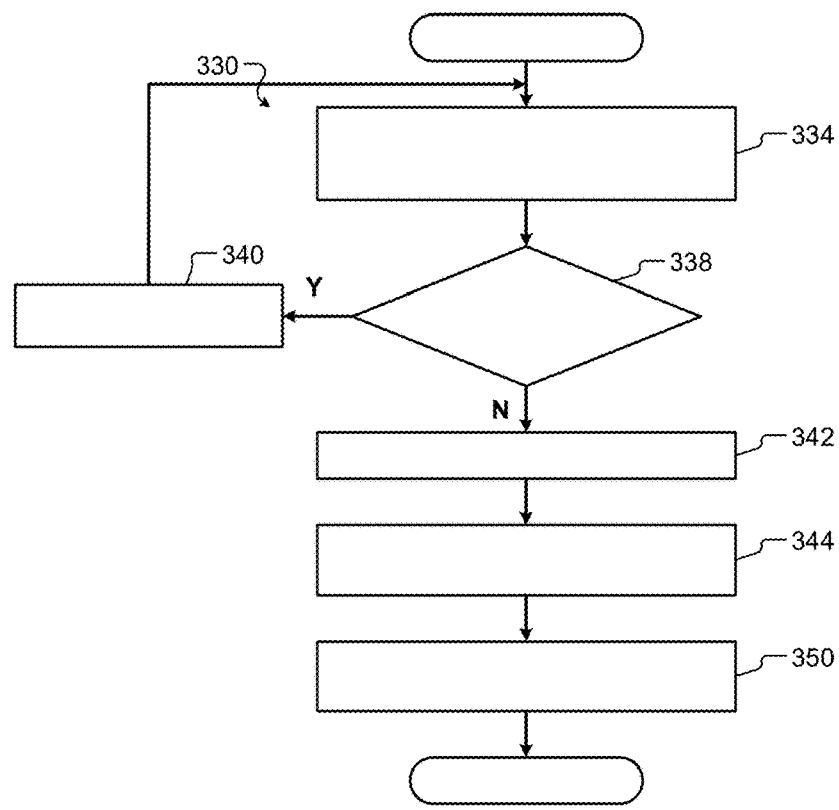
Figure 14:
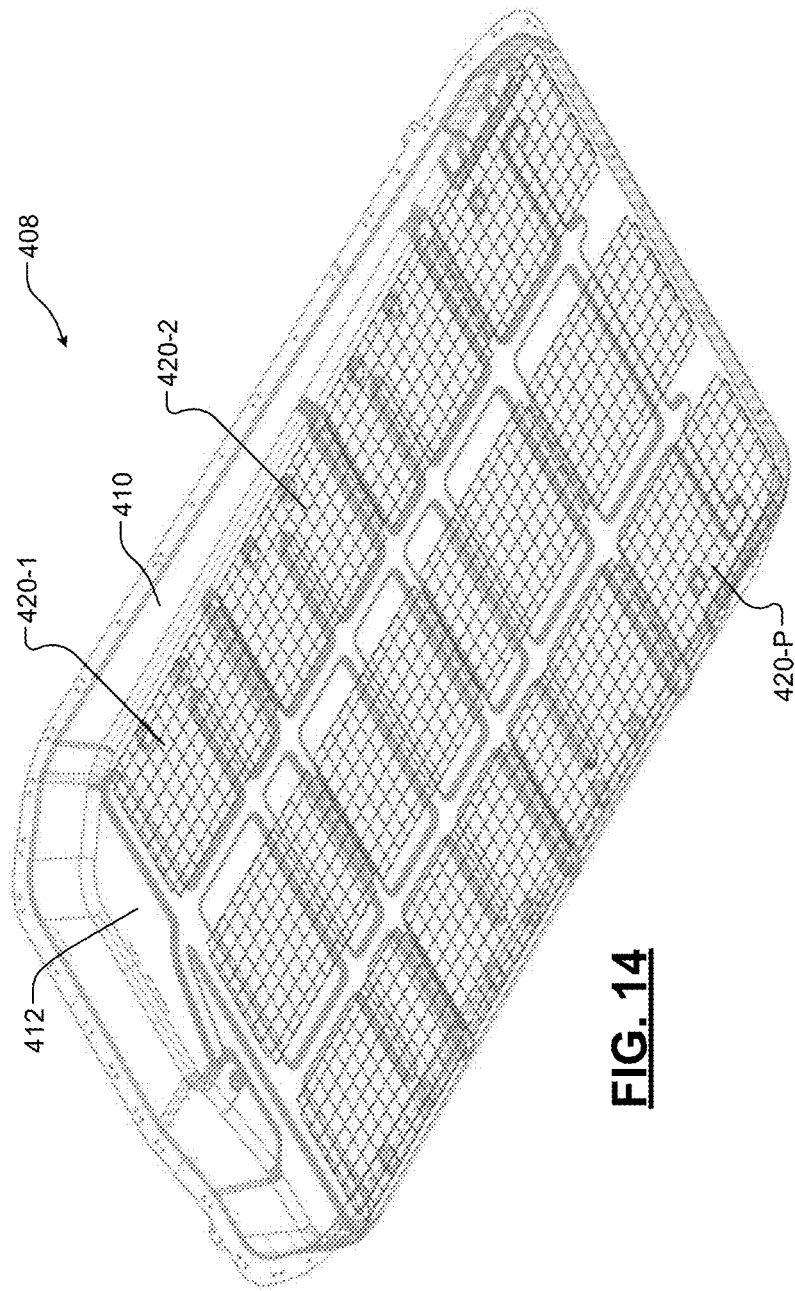
FIG. 14 is a perspective view of an electrical vehicle battery enclosure embedded with a plurality of carbon fiber sensors according to the present disclosure.

Referring now to FIGS. 12 and 13, flowcharts for examples of methods for identifying a location of damage in a composite panel are shown. In FIG. 12, a method 300 is shown. At 310, the equivalent resistance of an undamaged carbon fiber sensor is determined. At 314, j damage scenarios or permutations are identified (where j is an integer greater than one). At 318, the equivalent resistance of the carbon fiber sensor is determined for each of the j damage scenarios. At 322, a damage vector or table including the expected change in resistance for each of the j damage scenarios (relative to an undamaged carbon fiber tow) is determined.

In FIG. 13, a method 330 is shown. At 334, the measured resistance value of the equivalent resistance of the carbon fiber sensor is read. At 338, the method determines whether $R_e - \delta^* R_e \leq R_{em} \leq R_e + \delta^* R_e$, where $\delta$ is a confidence level of the measurement, $R_{em}$ is the measured equivalent resistance, and $R_e$ is the predetermined equivalent resistance of an undamaged sensor circuit. If 338 is false, then damage is detected at 342. At 344, the method finds $R_{em} +/- \delta^* R_{em}$ in the damage vector or table (and corresponding locations on the composite structure). At 330, the method identifies one or more damage locations based on the comparison. If 338 is true (i.e., no damage detected), the method waits a predetermined period at 340 and then returns to 334.

In some examples measuring the resistance of a continuous carbon fiber tow rather than a parallel circuit, the measured equivalent resistance may exceed the range ($R_e - \delta^* R_e \leq R_{em} \leq R_e + \delta^* R_e$) but is still within a predetermined threshold (less than infinity). This state corresponds to micro-damage due to stress/strain but not breakage. In this case, the measured equivalent resistance can be used to estimate the health or remaining life of the composite panel. In some examples, an operational lookup table is accessed using the measured equivalent resistance and the operational lookup table outputs health or remaining life of the composite panel. In other examples, a function generates the health or remaining life of the composite panel in response to the measured equivalent resistance, prior stored values and/or a rate of change of the resistance.

Referring now to FIG. 15, a composite panel 408 includes sidewalls 410 and a bottom surface 412 that may be exposed to damage due to road debris or other conditions. A plurality of carbon fiber sensors 420-1, 420-2, . . . , and 420-P are arranged along the bottom surface 412. The plurality of carbon fiber sensors 420-1, 420-2, . . . , and 420-P are connected to one or more controllers (not shown).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A composite panel comprising:
   a first carbon fiber layer;
   a first glass fiber layer;
   a first carbon fiber sensor including a first plurality of carbon fiber tows;
   a second glass fiber layer; and
   a second carbon fiber layer,
   wherein the first carbon fiber sensor is arranged between the first glass fiber layer and the second glass fiber layer, and the first carbon fiber layer and the second carbon fiber layer are arranged adjacent to the first glass fiber layer and the second glass fiber layer, respectively.

2. The composite panel of claim 1, wherein:
   the first plurality of carbon fiber tows are connected in parallel to first and second nodes that extend from the composite panel; and
   each of the first plurality of carbon fiber tows of the first carbon fiber sensor has a resistance different than other ones of the first plurality of carbon fiber tows.

3. The composite panel of claim 2, further comprising:
   a second carbon fiber sensor including a second plurality of carbon fiber tows connected in parallel to third and fourth nodes that extend from the composite panel; and
   a third glass fiber layer,
   wherein the second carbon fiber layer is arranged between the second glass fiber layer and the third glass fiber layer.

4. The composite panel of claim 3, wherein each of the second plurality of carbon fiber tows of the second carbon fiber sensor has a resistance different than other ones of the second plurality of carbon fiber tows.

5. The composite panel of claim 3, wherein the first carbon fiber sensor is arranged rotated relative to the second carbon fiber sensor.

6. The composite panel of claim 1, further comprising one or more discrete resistors connected to one or more of the first plurality of carbon fiber tows to change a resistance of the one or more of the first plurality of carbon fiber tows.

7. A damage monitoring system comprising:
the composite panel of claim 1; and
a controller configured to:
measure an equivalent resistance of the first carbon fiber sensor; and
identify one or more of the first plurality of carbon fiber tows that are broken based on the equivalent resistance.

8. The damage monitoring system of claim 7, wherein the controller is configured to identify a location of a broken one of the carbon fiber tows in the composite panel.

9. The damage monitoring system of claim 7, wherein the controller is configured to determine a change in the equivalent resistance of the first carbon fiber sensor relative to a predetermined resistance and selectively identify one or more of the first plurality of carbon fiber tows that have been broken in response to the change in the equivalent resistance.

10. A composite panel comprising:
a first carbon fiber layer;
a first carbon fiber sensor comprising N hybrid tows including a plurality of carbon fiber filaments surrounded by a plurality of glass fiber filaments, where N is an integer greater than or equal to one; and
a second carbon fiber layer, wherein the first carbon fiber sensor is arranged between the first carbon fiber layer and the second carbon fiber layer.

11. The composite panel of claim 10, wherein:
N is greater than one;
the N hybrid tows are connected in parallel to first and second nodes; and
each of the N hybrid tows of the first carbon fiber sensor has a resistance different than other ones of the N hybrid tows.

12. A damage monitoring system comprising:
the composite panel of claim 11; and
a controller configured to:
measure an equivalent resistance of the first carbon fiber sensor; and
identify one or more of the N hybrid tows that are broken based on the equivalent resistance.

13. The damage monitoring system of claim 12, wherein the controller is configured to identify a location of broken ones of the N hybrid tows in the composite panel.

14. The damage monitoring system of claim 12, wherein the controller is configured to determine a change in the equivalent resistance of the first carbon fiber sensor relative to a predetermined resistance and selectively identifies one or more the N hybrid tows that are broken in response to the change in the equivalent resistance.

15. The composite panel of claim 10, further comprising:
a second carbon fiber sensor including M hybrid tows connected in parallel to third and fourth nodes, where M is an integer greater than one; and
wherein the second carbon fiber sensor is arranged between the first carbon fiber layer and the second carbon fiber layer.

16. The composite panel of claim 15, wherein the first carbon fiber sensor is rotated relative to the second carbon fiber sensor.

17. A health monitoring system comprising:
the composite panel of claim 10; and
a controller configured to:
measure an equivalent resistance of the N hybrid tows, where N is equal to one; and
determine change in the equivalent resistance of the at least one of the N hybrid tows relative to a predetermined resistance; and
calculate a health of the composite panel in response to the change in the equivalent resistance.

18. A health monitoring system comprising:
a hybrid composite panel comprising:
a first carbon fiber layer;
a first carbon fiber sensor comprising a plurality of hybrid tows including a plurality of carbon fiber tows; and a plurality of glass fiber tows, the plurality of hybrid tows including a plurality of carbon fiber filaments surrounded by a plurality of glass fiber filaments; and
a second carbon fiber layer, wherein the first carbon fiber sensor is arranged between the first carbon fiber layer and the second carbon fiber layer; and
a controller configured to:
measure an equivalent resistance of at least one of the carbon fiber tows;
determine change in the equivalent resistance of the at least one of the carbon fiber tows relative to a predetermined resistance; and
calculate a health of the hybrid composite panel in response to the change in the equivalent resistance.

19. The health monitoring system of claim 18, wherein the at least one of the carbon fiber tows is insulated the plurality of glass fiber tows.

20. The health monitoring system of claim 18, wherein the controller is further configured to identify when the at least one of the carbon fiber tows is broken based on the equivalent resistance.

* * * * *